US006226091B1

United States Patent
Cryan

(10) Patent No.: US 6,226,091 B1
(45) Date of Patent: May 1, 2001

(54) OPTICAL FIBER MACH-ZEHNDER INTERFEROMETER FABRICATED WITH ASYMMETRIC COUPLERS

(75) Inventor: Colm V. Cryan, Arlington, MA (US)

(73) Assignee: Thomas & Betts International, Inc., Sparks, NV (US)

(*) Notice: Subject to any disclaimer, the term of this patent is extended or adjusted under 35 U.S.C. 154(b) by 0 days.

(21) Appl. No.: 09/404,083

(22) Filed: Sep. 23, 1999

Related U.S. Application Data

(60) Provisional application No. 60/101,592, filed on Sep. 24, 1998.

(51) Int. Cl.[7] ............................................ G01B 9/02
(52) U.S. Cl. ................................................... 356/477
(58) Field of Search .............................. 356/477; 385/27, 385/37

(56) References Cited

U.S. PATENT DOCUMENTS

| 5,841,920 | 11/1998 | Lemaire et al. |
| 5,875,272 | * 2/1999 | Kewitsch et al. ............. 385/37 |

OTHER PUBLICATIONS

S.J. Madden, P.G. Jacob, J.S. Harradence, C. Robilliard: "High Performance Modular DWDM Implementation Based On Fibre Bragg Grating Mach Zehnder Interferometers," *NFOEC* 1998, vol. 1, pp. 453–463.

F. Bilodeau, D.C. Johnson, S. Thériault, B. Malo, J. Albert, and K.O. Hill: "An All–Fiber Dense–Wavelength–Division Multiplexer/Demultiplexer Using Photoimprinted Bragg Gratings," *IEEE Photonics Technology Letters,* Apr. 1995, vol. 7, No. 4, pp. 388–390.

D.A. Nolan and W.J. Miller: "Wavelength–Tuned Mach–Zehnder Device," *OFC '94 Technical Digest,* WF5, pp. 94–95.

F. Gonthier, D. Ricard, S. Lacroix, and J. Bures: "Wavelength–Flattened 2 x 2 Splitters Made of Identical Single–Mode Fibers," *Optics Letters,* Aug. 1, 1991, vol. 16, No. 15, pp. 1201–1203.

A. Tervonen, S. Honkanen, S. I. Najafi: "Analysis of Symmetric Directional Couplers and Asymmetric Mach–Zehnder Interferometers As 1.30– and 1.55–$\mu$m Dual–Wavelength Demultiplexers/Multiplexers," *Optical Engineering,* Sep. 1993, vol. 32, No. 9, pp. 2083–2090.

* cited by examiner

*Primary Examiner*—Samuel A. Turner
(74) *Attorney, Agent, or Firm*—Weingarten, Schurgin, Gagnebin & Hayes LLP

(57) ABSTRACT

An asymmetric optical fiber Mach-Zehnder interferometer has first and second optical fibers connected at a first coupling region and a second coupling region. The first and second optical fibers form two interfering arms between the first and second coupling regions. To form the asymmetry, the propagation constant in a portion of the first optical fiber in one of the coupling regions differs from the propagation constant in a portion of the second optical fiber in that coupling region. The asymmetric structure provides 30 dB isolation over a greater wavelength span.

20 Claims, 9 Drawing Sheets

OPTICAL FIBER MACH-ZEHNDER INTERFEROMETER FABRICATED WITH ASYMMETRIC COUPLERS

CROSS REFERENCE TO RELATED APPLICATIONS

This application claims the benefit under 35 U.S.C. §119 (e) of U.S. application Ser. No. 60/101,592, filed on Sep. 24, 1998, the disclosure of which is incorporated herein by reference.

STATEMENT REGARDING FEDERALLY SPONSORED RESEARCH OR DEVELOPMENT

N/A

BACKGROUND OF THE INVENTION

A wavelength division multiplexer/demultiplexer can be fabricated from a fiber optic Mach-Zehnder interferometer (MZI). The MZI is fabricated from a pair of symmetric couplers. Identical fiber Bragg gratings are written in the interfering arms between the couplers. A fiber Bragg grating (FBG) is a change in the refractive index in the fiber core that reflects a selective wavelength on the fiber.

In operation of the MZI to drop or extract a wavelength, for example, as a demultiplexer, a signal carrying several channels or wavelengths $\lambda 1, \lambda 2, \lambda 3, \lambda 4$, and $\lambda 5$ is input into the first fiber of the first coupler. Other numbers of channels, for example, 4 or 8 channels, may be input into the coupler. The signal is split at the coupler to pass along both arms. The FBGs, which are identical, are resonant at a selected frequency, for example, $\lambda 4$. Thus, at the FBGs, $\lambda 4$ is reflected, passes back through the first coupler, and is extracted on the second fiber of the first coupler. The remaining wavelengths, $\lambda 1, \lambda 2, \lambda 3$, and $\lambda 5$, pass through the second coupler and are output on the second fiber of the second coupler.

In operation to add or insert a wavelength, for example, as a multiplexer, a signal having the wavelength $\lambda 4$ is inserted on the first fiber at the second coupler. A signal of various wavelengths $\lambda 1, \lambda 2, \lambda 3$, and $\lambda 5$, is input into the first fiber of the first coupler. As described above with respect to the demultiplexer, $\lambda 4$ is reflected at the FBGs. $\lambda 4$ is then output on the second fiber of the second coupler. Thus, the output of the second coupler includes all the wavelengths, $\lambda 1, \lambda 2, \lambda 3, \lambda 4$, and $\lambda 5$.

In typical Mach-Zehnder interferometers fabricated from symmetric couplers, 30 dB isolation is limited to spans of ±20 nm about the desired wavelength.

SUMMARY OF THE INVENTION

The present invention provides an optical fiber Mach-Zehnder interferometer fabricated from asymmetrical couplers, which allow 30 dB isolation over a wider wavelength range about a desired wavelength.

More particularly, the asymmetric optical fiber Mach-Zehnder interferometer of the present invention comprises first and second optical fibers connected at a first coupling region and a second coupling region. The first and second optical fibers form two interfering arms between the first and second coupling regions. To form the asymmetry, the propagation constant in a portion of the first optical fiber in one of the coupling regions, for example, the first coupling region, differs from the propagation constant in a portion of the second optical fiber in that coupling region. The propagation constant in the first optical fiber and the propagation constant in the second optical fiber are chosen to provide 30 dB isolation in a through port of the Mach-Zehnder interferometer over a span of more than ±20 nm, and preferably more than ±60 nm, about a desired wavelength. The splitting ratio of the first coupling region is controlled to split the power 50 percent at a desired wavelength.

DESCRIPTION OF THE DRAWINGS

The invention will be more fully understood from the following detailed description taken in conjunction with the accompanying drawings in which.

DETAILED DESCRIPTION OF THE INVENTION

Figure 1:
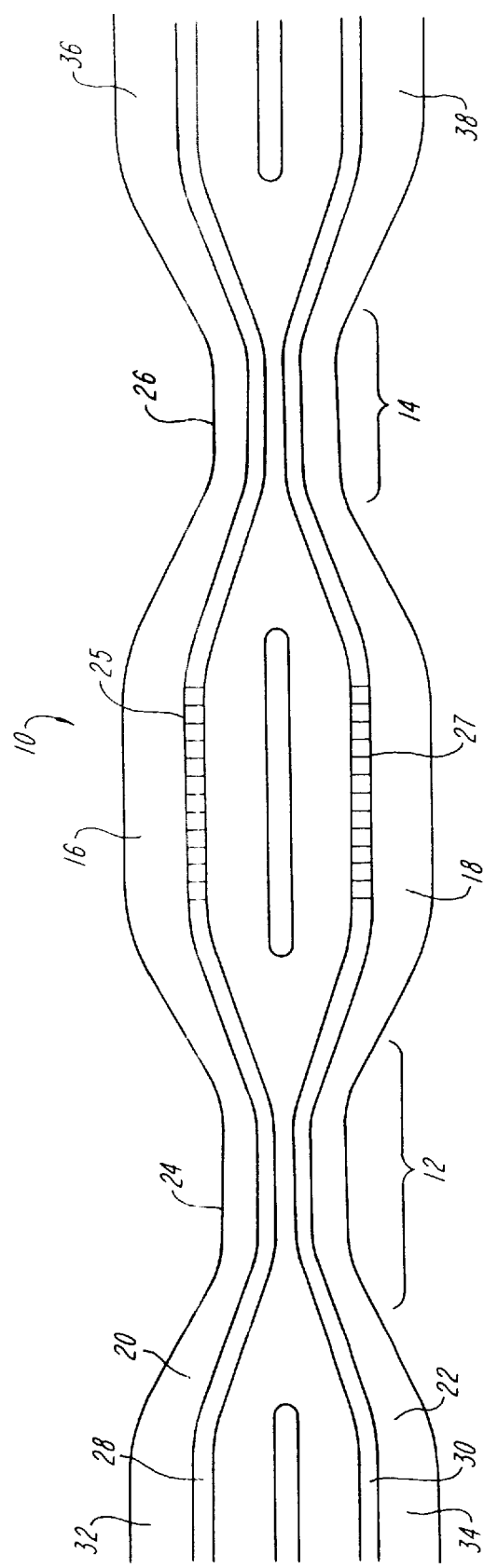
FIG. 1 is a schematic illustration of an asymmetric Mach-Zehnder interferometer according to the present invention.

FIG. 1 illustrates an asymmetric Mach-Zehnder interferometer (MZI) 10 according to the present invention. The MZI comprises two coupling regions 12, 14 separated by interfering arms 16, 18. More particularly in the embodiment illustrated, the MZI is formed from first and second optical fibers 20, 22 that are coupled at first and second asymmetric couplers 24, 26. For the purposes of the present invention, a coupler is a device that splits the incoming optical energy between two output fibers. The first and second fibers 20, 22 form the interfering arms 16, 18 that connect the couplers 24, 26. A fiber Bragg grating (FBG) 25, 27 is written in the core 28, 30 of each of the interfering arms 16, 18 between the two couplers 24, 26. In operation, at one side of the MZI, one fiber, such as fiber 20, constitutes an input or insert port 32, and the other fiber, fiber 22, constitutes a drop or extract port 34. At the other side of the MZI, the fiber 20 constitutes an add or insert port 36, and the fiber 22 constitutes an output or through port 38.

In the present invention, the asymmetric couplers as well as the location of the fibers improves the spectral performance of the MZI. In a symmetric coupler, the electric field in the coupled port lags the electric field in the input port by a phase of π/2. The same phase relationship, however, does not hold for the asymmetric coupler. In an asymmetric coupler, the phase difference between the fields depends on the coupling strength and the degree of asymmetry.

In a symmetric coupler, the constituent fibers have substantially identical propagation constants in the coupling region so that the coupling ratio can be 100%. In the fabrication of Mach-Zehnder interferometers, the splitting ratio of the constituent couplers is substantially 50%. The splitting ratio of a symmetric coupler goes as the sine of the wavelength. The 50% point occurs at the quadrate of the wavelength response and hence is sensitive to small changes in wavelength.

Figure 2:
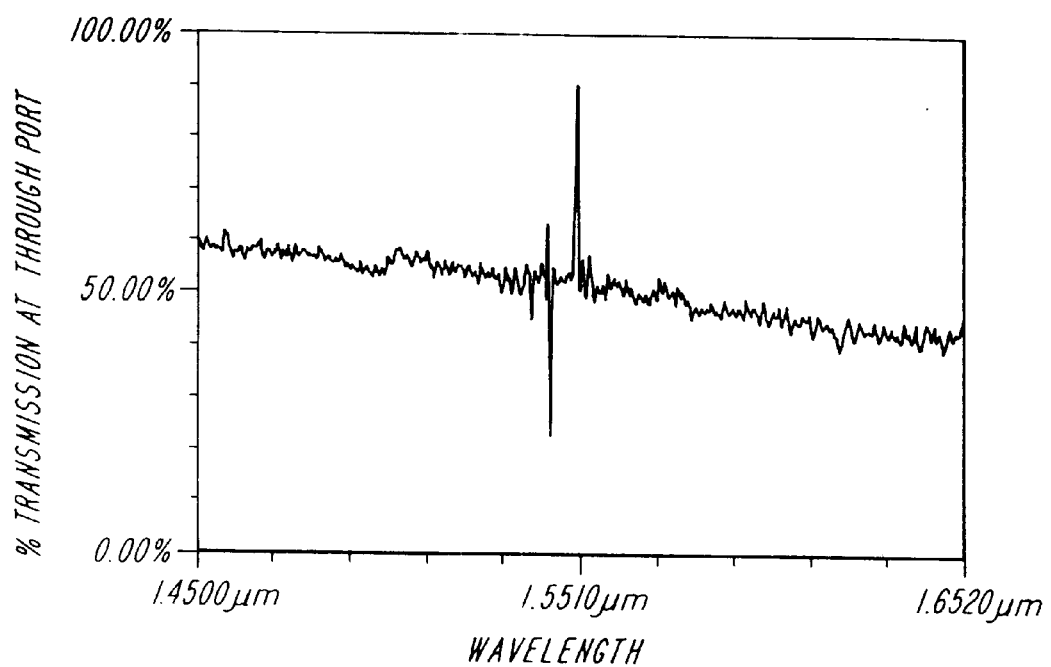
FIG. 2 is a graph of the measured spectral response of a prior art symmetric coupler.

FIG. 2 illustrates a graph of measured spectral response of a typical symmetric coupler. The excess loss of the coupler was approximately 0.07 dB. The spikes are measurement artifacts from mode movement in the FP laser. From the graph, it can be seen that the wavelength variation in the region of interest (around the quadrate) is approximately 0.125%/nm. It is this large wavelength variation that reduces the isolation of the MZI to under 30 dB for spans greater than ±20 nm about the center wavelength.

Figure 3:
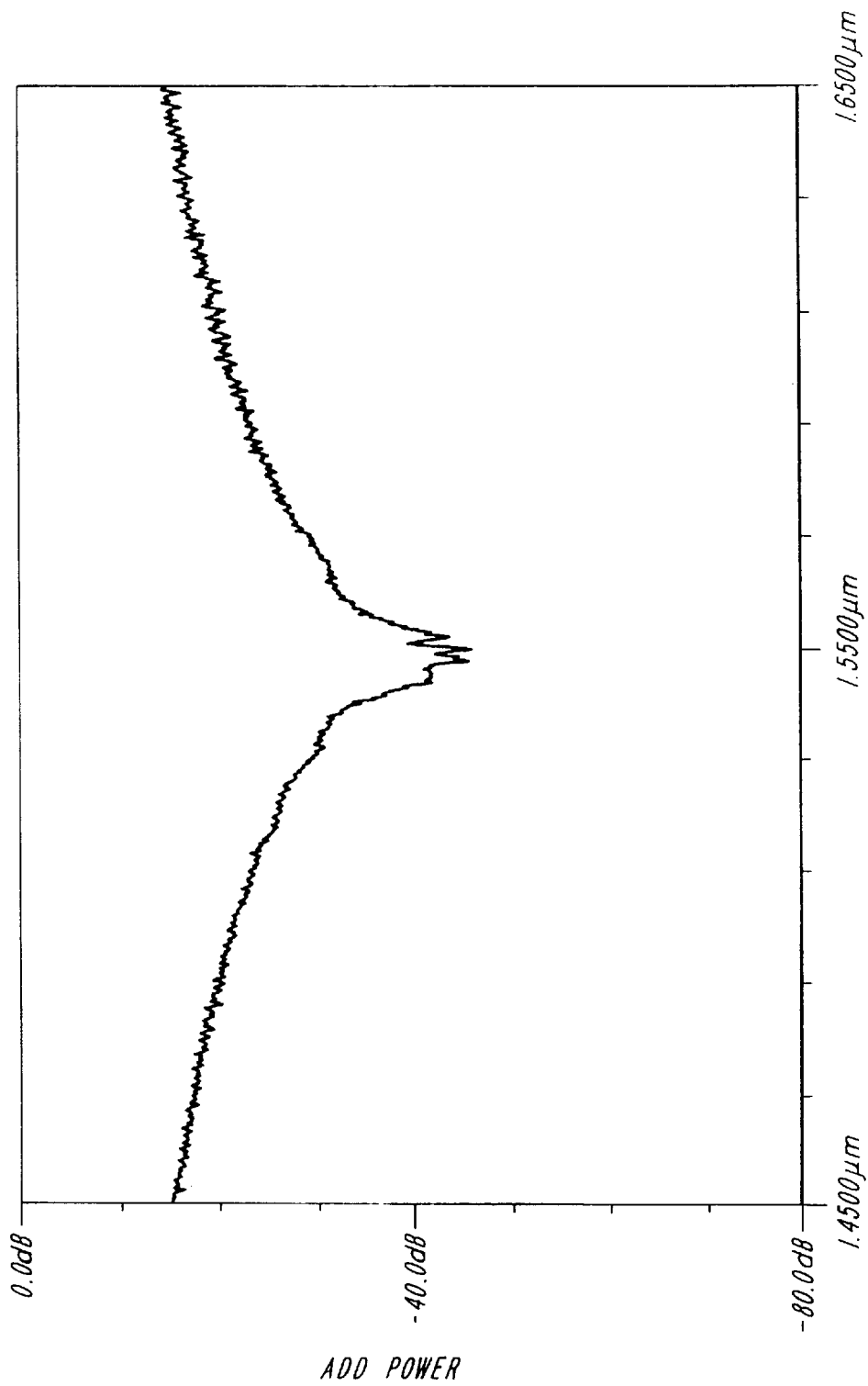
FIG. 3 is a graph of the measured spectral response of the add fiber in a prior art Mach-Zehnder interferometer fabricated from symmetric couplers.

FIG. 3 shows the measured spectral response of the add fiber in an MZI fabricated from typical symmetric couplers. From the graph, it can be seen that 30 dB isolation can be achieved in the add fiber over a wavelength range of 40 nm, which is a narrow wavelength range. The limited span of the 30 dB isolation region arises from the wavelength sensitivity of the couplers used to fabricate the MZI.

Figure 4:
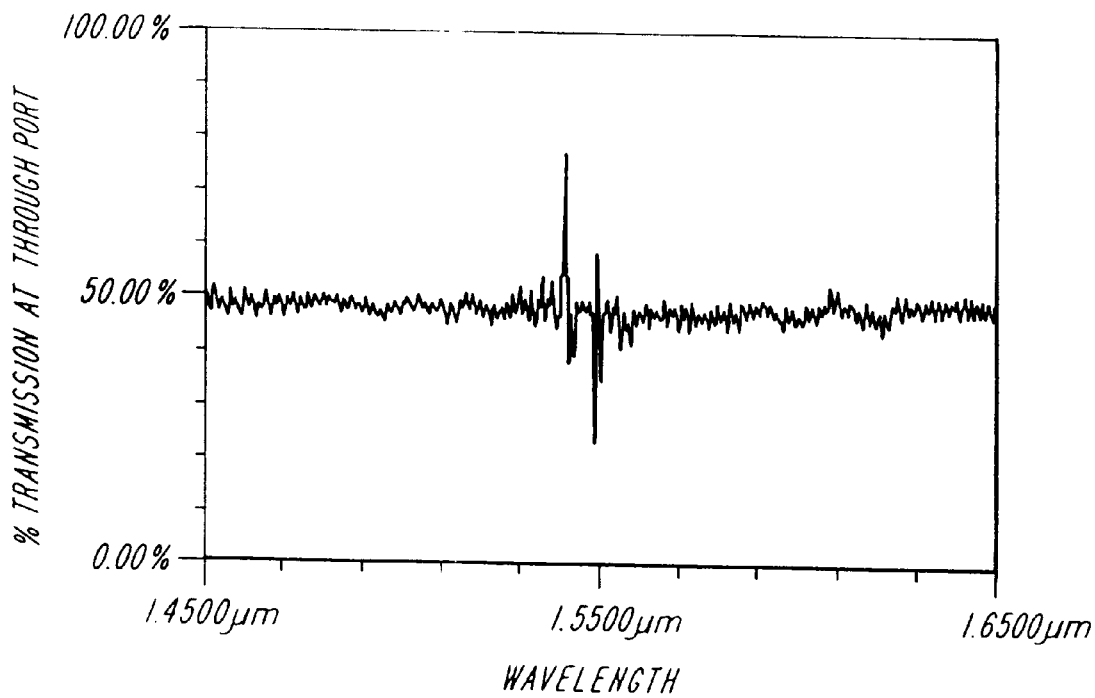
FIG. 4 is a graph of the measured spectral response of an asymmetric coupler used in the present invention.

In an asymmetric coupler, the propagation constants of the fibers are not identical in the coupling region. Thus, the maximum coupling ratio achievable is less than 100%. The splitting ratio of an asymmetric coupler also goes as the sine of the wavelength. However, the maximum splitting ratio can be controlled. Hence, in an asymmetric coupler, the 50% point can substantially occur at the maximum of the wavelength response and is thus less sensitive to changes in wavelength. FIG. 4 is a graph of measured spectral response of a typical asymmetric coupler. The excess loss of the coupler was approximately 0.09 dB. The spikes are measurement artifacts from mode movement in the FP laser. From the graph it can be seen that the wavelength variation in the region of interest is approximately 0.03%/nm. It is this reduced wavelength variation that allows 30 dB isolation in the through fiber to be achieved over spans greater than ±60 nm about the center wavelength. This is substantially greater than the span of ±20 nm achievable with the symmetric coupler discussed above.

The most common method of fabricating the coupler is the fused taper method. For example, jackets of the two fibers are stripped for an appropriate length. The fibers are held together with the regions to be coupled maintained substantially parallel to each other and in contact. The coupling region is heated to a temperature of approximately 1700° C. until they fuse together. The fibers may be heated with any suitable heat source, such as an electric arc, oxygen butane flame, or laser. As they are heated, the fibers are also drawn or stretched to create a narrowed or necked down or waist region. The tapering brings the fiber cores closer together, increasing the interaction between the signals.

The asymmetry can be achieved by pre-tapering, etching or polishing one of the coupled fibers in the coupling region, or by bending the coupling region in the fiber plane. The asymmetry can also be achieved by fusing one of the fibers to a third glass rod or tube in the coupling region. The glass rod or tube raises the propagation constant of the fiber it is attached to in the coupling region. A combination of these techniques may also be used.

Figure 5:
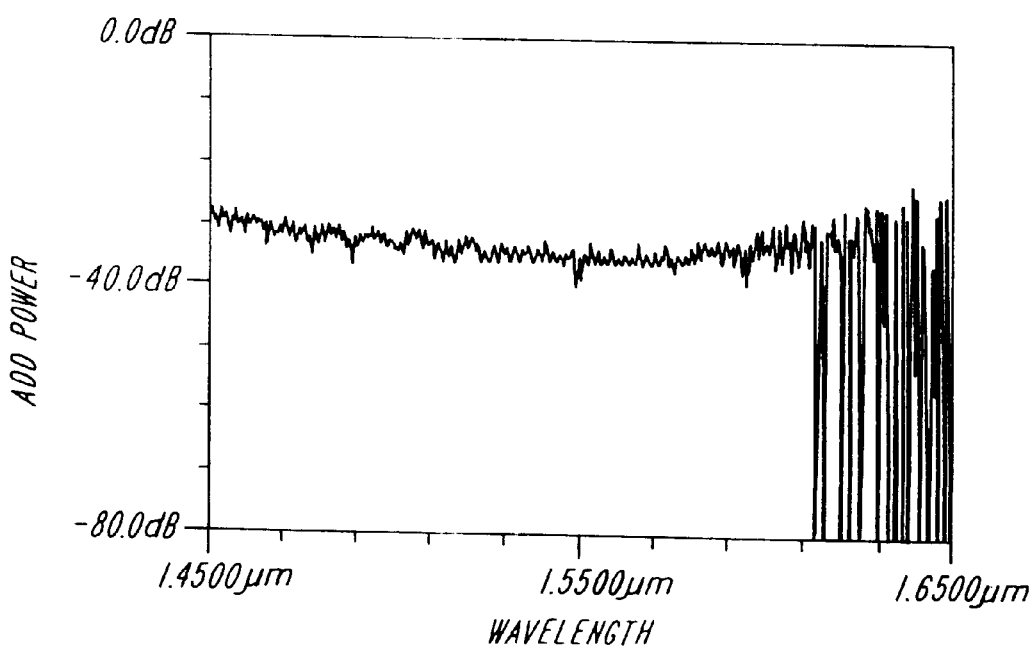
FIG. 5 is a graph of the measured spectral response of a Mach-Zehnder interferometer according to the present invention.

The degree of asymmetry and coupling strength is controlled so that the maximum splitting ratio of the coupler is substantially 50%. FIG. 5 is a measured response of the add fiber of a MZI fabricated using asymmetric couplers. The spikes are measurement artifacts. From the graph, it can be seen that 30 dB isolation can be achieved in the add, or drop, fiber over a wavelength range of 120 nm, which is substantially larger than the 40 nm range achievable with the prior art symmetric MZI described above.

After the two couplers are formed, the fiber Bragg gratings are written in the fiber cores in the two interfering arms. The fiber Bragg gratings may be written in any known manner. For example, using a photosensitive fiber, a silica phase mask having grooves etched thereon in the desired periodicity is placed close to the fiber. The fiber and mask are illuminated with an ultraviolet (UV) light source, such as a laser beam. The phase mask diffracts the light from the UV light source, creating multiple interfering beams. The UV light passes through the photo-sensitive fiber, altering the refractive index distribution therein and forming an FBG. In another technique to form an FBG, a UV laser beam is moved along the length of the fiber and turned on and off as it travels. Other techniques for writing the FBG may be used, such as interference holograms, interfering laser beams, or amplitude masks.

Two embodiments are preferred in the present invention, a point symmetric MZI and a line symmetric MZI. Both embodiments may be used to fabricate the MZI and both may be used in conjunction with fiber Bragg gratings.

Figure 6:
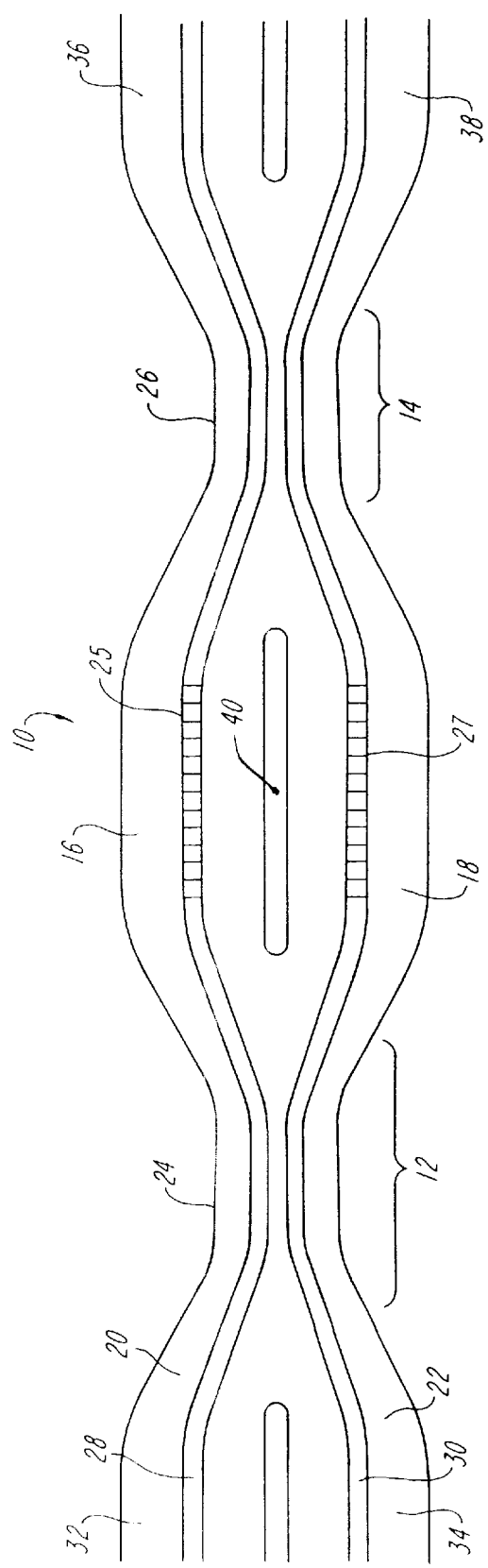
FIG. 6 is a schematic illustration of a point symmetric Mach-Zehnder interferometer according to the present invention.
Figure 7A:
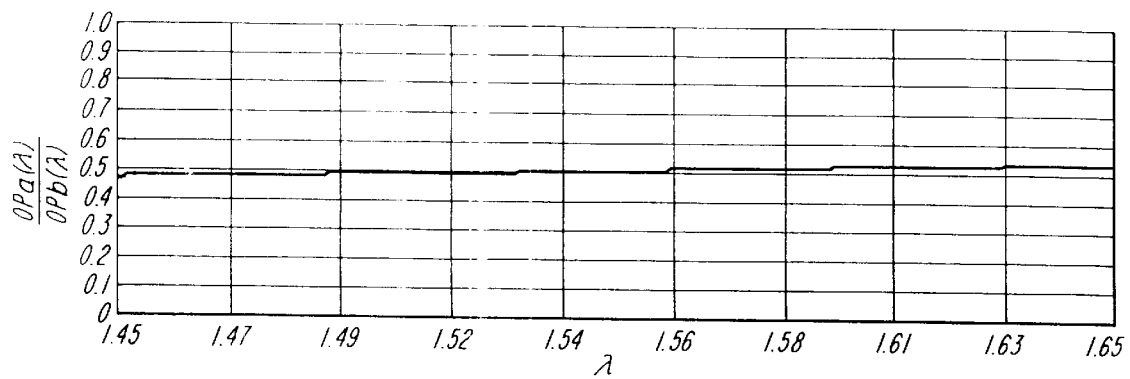
FIGS. 7A–7E are graphs illustrating operation of a point symmetric Mach-Zehnder interferometer according to the present invention.
Figure 7B:
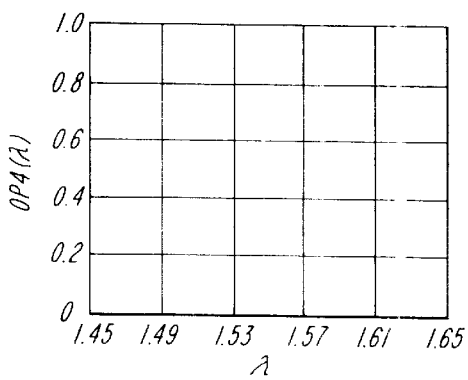
Figure 7C:
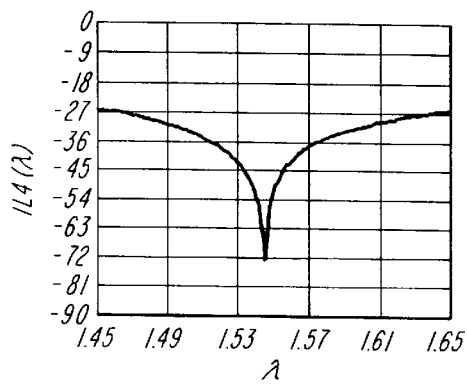
Figure 7D:
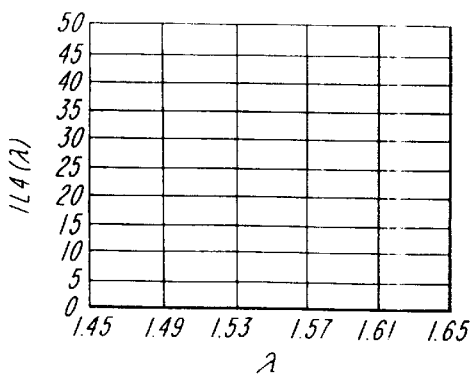
Figure 7E:
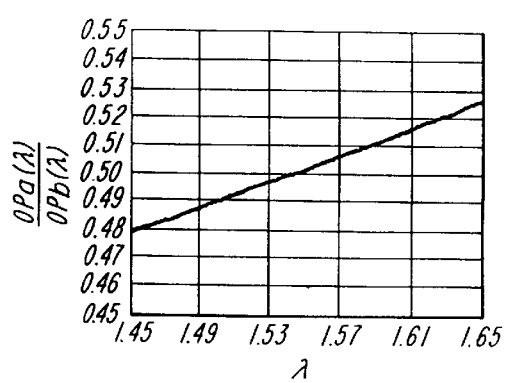

Referring to FIG. 6, a point symmetric MZI is one that is substantially symmetric about a point 40 in the middle of the interferometer arms. The fiber 20 in the coupling region 12 has a first propagation constant, preferably, the propagation constant of a standard fiber. The fiber 22 in the coupling region 12 is modified to have a different propagation constant. The fiber 22 in the coupling region 14 has the first or standard propagation constant. The fiber 20 in the coupling region 14 is modified to have a different propagation constant.

The operation of the point symmetric MZI is described as follows, with reference to FIGS. 7A–7E (the couplers are described in terms of transfer matrices and all the variables are given typical values):

$$\lambda := 1.25, 1.252. \ 1.65 \qquad i := \sqrt{-1}$$

$$fa := .6 \qquad Fa := \sqrt{fa} \qquad \phi a := \sqrt{1 - fa}$$

$$fb := fa \qquad Fb := \sqrt{fb}$$

$$\phi b := \sqrt{1 - fb}$$

$$\Delta \lambda a := 7.48 \qquad \lambda a := 03.665$$

$$l1 := 10000$$

$$l2 := 10000$$

$$\Delta \lambda b := \Delta \lambda a$$

$$\lambda b := \lambda a$$

$$\Delta 1 := l1 - l2$$

$$Ca(\lambda) := \pi \cdot \left( \frac{\lambda a - \lambda}{\Delta \lambda a} \cdot \frac{1}{Fa} \right) \qquad \Delta 1 = 0$$

$$\beta o(\lambda) := 2 \cdot \frac{\pi}{\lambda} \cdot 1.458$$

-continued $$Cb(\lambda) := \pi \cdot \left(\frac{\lambda b - \lambda}{\Delta \lambda b} \cdot \frac{1}{Fb}\right)$$

$$Ca(1.5) = 1.174$$

Ma $$(\lambda) := \begin{bmatrix} \cos(Ca(\lambda)) + \phi a \cdot i \cdot \sin(Ca(\lambda)) & i \cdot Fa \cdot \sin(Ca(\lambda)) \\ i \cdot Fa \cdot \sin(Ca(\lambda)) & \cos(Ca(\lambda)) - \phi a \cdot i \cdot \sin(Ca(\lambda)) \end{bmatrix}$$

$$Leg4 := \begin{bmatrix} 0 \\ 1 \end{bmatrix} \quad IP := \begin{bmatrix} 1 \\ 0 \end{bmatrix}$$

Mb $$(\lambda) := \begin{bmatrix} \cos(Cb(\lambda)) + \phi b \cdot i \cdot \sin(Cb(\lambda)) & i \cdot Fb \cdot \sin(Cb(\lambda)) \\ i \cdot Fb \cdot \sin(Cb(\lambda)) & \cos(Cb(\lambda)) + \phi b \cdot i \cdot \sin(Cb(\lambda)) \end{bmatrix}$$

$$Leg2 := \begin{bmatrix} 1 \\ 0 \end{bmatrix}$$

$$OPa(\lambda) := (|Ma(\lambda) \cdot IP \cdot Leg2|)^2$$

$$OPb(\lambda) := (|Mb(\lambda) \cdot IP \cdot Leg2|)^2$$

$$OPa(1.5) = 0.49$$

$$Mf(\lambda) := \begin{bmatrix} e^{i \cdot \beta o(\lambda) \cdot l1} & 0 \\ 0 & e^{i \cdot \beta o(\lambda) \cdot l2} \end{bmatrix}$$

$$OP4(\lambda) := (|Mb(\lambda) \cdot Mf(\lambda) \cdot Ma(\lambda) \cdot IP \cdot Leg4|)^2$$

$$IL4(\lambda) := 10 \cdot \log(1 - OP4(\lambda))$$

Figure 8:
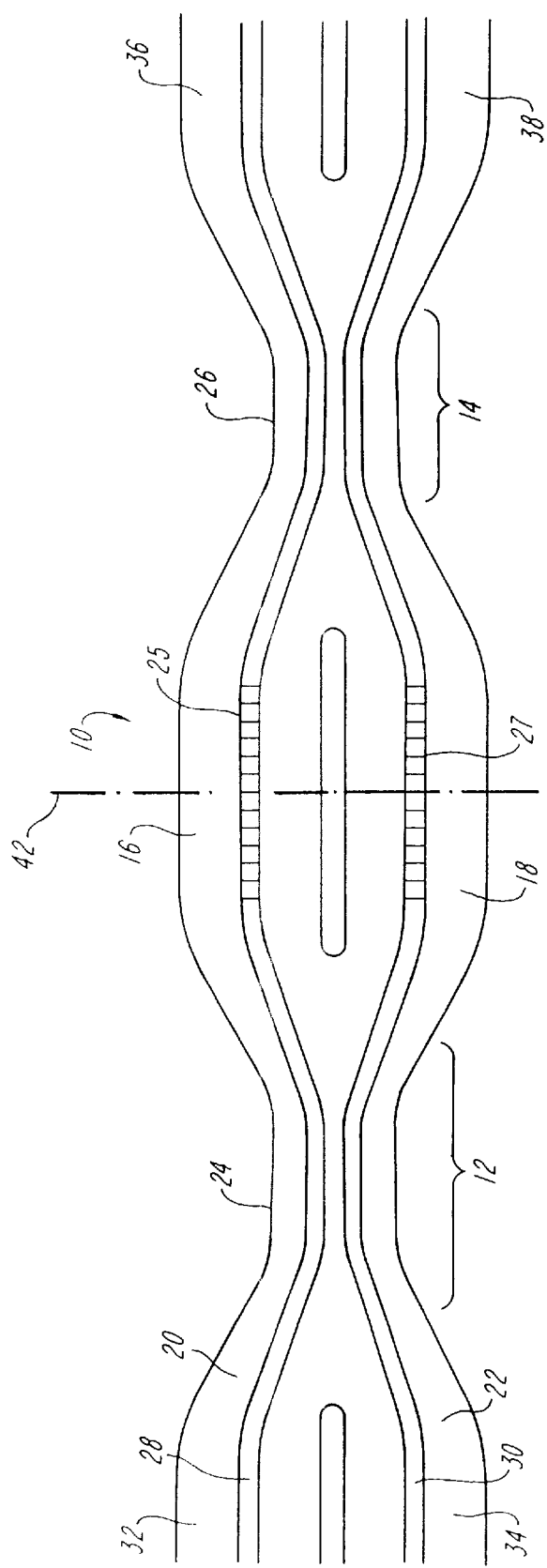
FIG. 8 is a schematic illustration of a line symmetric Mach-Zehnder interferometer according to the present invention.
Figure 9A:
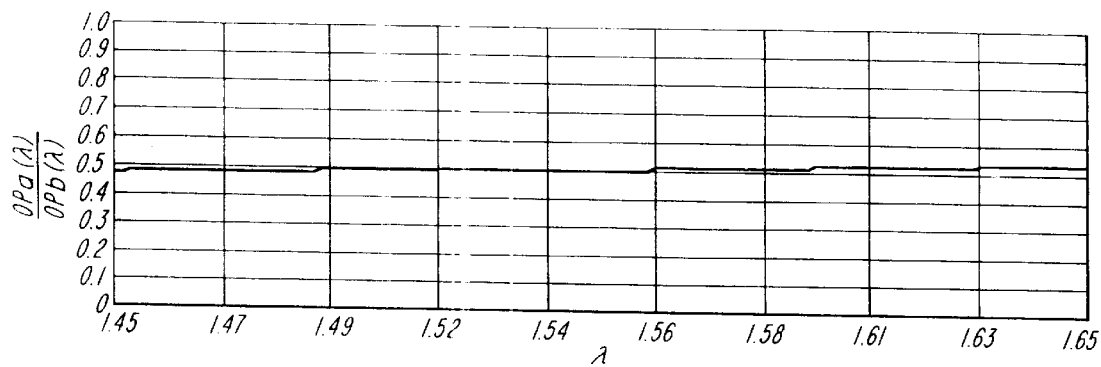
FIGS. 9A–9E are graphs illustrating operation of a line symmetric Mach-Zehnder interferometer according to the present invention.
Figure 9B:
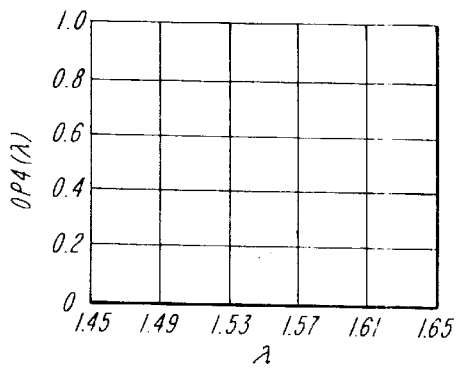
Figure 9C:
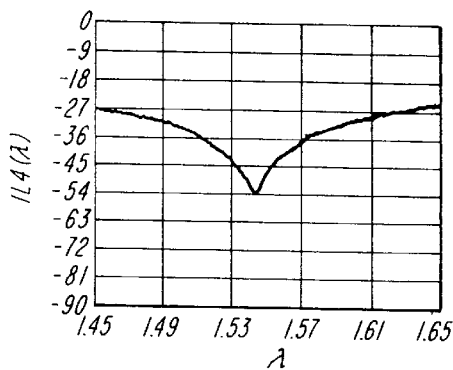
Figure 9D:
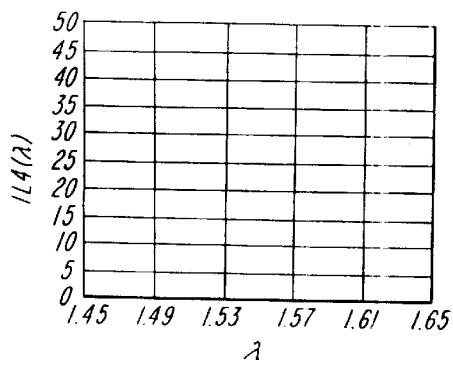
Figure 9E:
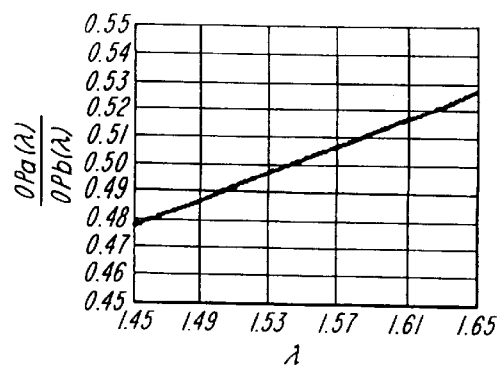

Referring to FIG. 8, a line symmetric MZI is one that is substantially symmetric about a line 42 through the interfering arms. One fiber, such as the fiber 20, has a first propagation constant, preferably the propagation constant of a standard fiber, at both the coupling region 12 and the coupling region 14. The other fiber, fiber 22 is modified to have a different propagation constant a both the coupling region 12 and the coupling region 14. The operation of the line symmetric MZI is described a follows, with reference to FIGS. 9A–9E (the couplers are described in terms of transfer matrices and all the variables are given typical values):

$$\lambda := 1.25, 1.252. \; 1.65 \quad i := \sqrt{-1}$$

$$fa := .6 \quad Fa := \sqrt{fa} \quad \phi a := \sqrt{1 - fa}$$

$$fb := fa \quad Fb := \sqrt{fb}$$

$$\phi b := \sqrt{1 - fb}$$

$$\Delta \lambda a := 7.48 \quad \lambda a := 03.665$$

$$l1 := 10000$$

$$l2 := 10000.32265$$

$$\Delta \lambda b := \Delta \lambda a$$

$$\lambda b := \lambda a$$

$$\Delta l := l1 - l2$$

$$Ca(\lambda) := \pi \cdot \left(\frac{\lambda a - \lambda}{\Delta \lambda a} \cdot \frac{1}{Fa}\right) \quad \Delta l = -0.323$$

$$\beta o(\lambda) := 2 \cdot \frac{\pi}{\lambda} \cdot 1.458$$

$$Cb(\lambda) := \pi \cdot \left(\frac{\lambda b - \lambda}{\Delta \lambda b} \cdot \frac{1}{Fb}\right)$$

$$Ca(1.5) = 1.174$$

Ma

In the above equations and in FIGS. 7A–7E and FIGS. 9A–9E, the notation follows that of A. W. Snyder and J. D Love in *Optical Waveguide Theory*, published by Chapman and Hall. Note that in, the line symmetric embodiment, the path lengths are not equal, indicated by 12:=10000.32265 and Δl=−0.323.

As mentioned above, a number of alternate embodiment may be assembled for the present invention. For example the coupler may be fabricated using polished or D-shaped fiber couplers. Once again, the asymetry may be achieved by pre-tapering, etching or polishing one of the coupled fibers in the coupled region, or by bending the coupling region in the fiber plane. A combination of the techniques may also be used.

The fibers used to fabricate the coupler need not necessarily be fused together as in the case of a polished block coupler. For instance, the interferometer may be fabricated from one or more photo-sensitive fibers. In addition, the coupler may be composed of more than two fibers. For example, a 1×3 coupler may be fabricated wherein one or more of the fibers is photo-sensitive and the remaining fibers are photo-insensitive. Moreover, the splitting ratio may be other than 50%. For example, the maximum splitting ratio of the asymmetric couplers may be 40%.

Figure 10:
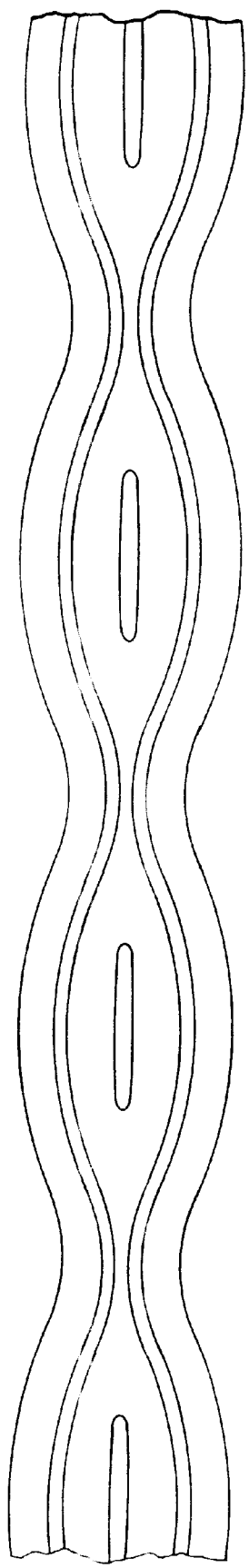
FIG. 10 is a schematic illustration of a further embodiment of an asymmetric Mach-Zehnder interferometer with three coupling regions.

The MZI may be composed of a symmetric and an asymmetric coupler. The splitting ratio and the maximum splitting ratio of both couplers need not necessarily be the same. Furthermore, the interfering arms of the MZI need not necessarily be balanced. Hence, the structure may be used to make wavelength division multiplexers, with or without fiber Bragg gratings. The MZI may be constructed from three or more couplers, in which one or more of the couplers are asymmetric. See FIG. 10. In another embodiment, the interfering arms of the MZI are different. By controlling the difference, the wavelength response of the output can be controlled.

The invention is not to be limited by what has been particularly shown and described, except as indicated by the appended claims.

I claim:

1. An asymmetric optical fiber Mach-Zehnder interferometer comprising:
   first and second optical fibers connected at a first coupling region and a second coupling region, the first and second optical fibers further forming two interfering arms between the first coupling region and the second coupling region;

wherein a propagation constant in a portion of the first optical fiber in the first coupling region is different from a propagation constant in a portion of the second optical fiber in the first coupling region, the propagation constant in the first optical fiber and the propagation constant in the second optical fiber chosen to provide a selected isolation in a through port of the Mach-Zehnder interferometer over a span of more than ±20 nm about a desired wavelength.

2. The asymmetric optical fiber Mach-Zehnder interferometer of claim 1, wherein the first and second coupling regions comprise first and second fused taper couplers.

3. The asymmetric optical fiber Mach-Zehnder interferometer of claim 1, wherein a splitting ratio of the first coupling region is controlled to split the power 51 percent at a desired wavelength.

4. The asymmetric optical fiber Mach-Zehnder interferometer of claim 1, wherein the propagation constant in the first optical fiber and the propagation constant in the second optical fiber are chosen to provide 30 dB isolation in the through port of the Mach-Zehnder interferometer over the span of more than ±20 nm about a desired wavelength.

5. The asymmetric optical fiber Mach-Zehnder interferometer of claim 4, wherein the propagation constant in the first optical fiber and the propagation constant in the second optical fiber are chosen to provide 30 dB isolation in a through port of the Mach-Zehnder interferometer over a span of more than ±60 nm about the desired wavelength.

6. The asymmetric optical fiber Mach-Zehnder interferometer of claim 1, wherein a propagation constant in the first optical fiber in the second coupling region is different from a propagation constant in a portion of the second optical fiber in the second coupling region.

7. The asymmetric optical fiber Mach-Zehnder interferometer of claim 1, wherein:

the portion of the first optical fiber in the first coupling region has a first propagation constant; and the portion of the second optical fiber in the first coupling region has a different propagation constant from the first propagation constant.

8. The asymmetric optical fiber Mach-Zehnder interferometer of claim 7, wherein:

a further portion of the first optical fiber in the second coupling region has the first propagation constant; and a further portion of the second optical fiber in the second coupling region has a different propagation constant from the first propagation constant.

9. The asymmetric optical fiber Mach-Zehnder interferometer of claim 7, wherein:

a further portion of the first optical fiber in the second coupling region has a different propagation constant from the first propagation constant; and a further portion of the second optical fiber in the second coupling region has the first propagation constant.

10. The asymmetric optical fiber Mach-Zehnder interferometer of claim 1, wherein the propagation constant in the portion of the second optical fiber is provided by a pretapered, etched, or polished section of the second optical fiber.

11. The asymmetric optical fiber Mach-Zehnder interferometer of claim 1, wherein the first and second fibers in the first coupling region are bent in a fiber plane to provide differing propagation constants.

12. The asymmetric optical fiber Mach-Zehnder interferometer of claim 1, wherein a fiber Bragg grating is written in each of the two interfering arms.

13. The asymmetric optical fiber Mach-Zehnder interferometer of claim 1, wherein the first and second optical fibers comprise polished optical fibers.

14. The asymmetric optical fiber Mach-Zehnder interferometer of claim 1, wherein the first and second optical fibers comprise optical fibers having a D-shaped cross-section.

15. The asymmetric optical fiber Mach-Zehnder interferometer of claim 1, further comprising a third optical fiber coupled to the first and second optical fibers at one of the first and second coupling regions.

16. The asymmetric optical fiber Mach-Zehnder interferometer of claim 1, wherein at least one of the first and second optical fibers comprises a photo-sensitive fiber.

17. An asymmetric optical fiber Mach-Zehnder interferometer comprising:

first and second optical fibers connected at a first coupling region and a second coupling region, the first and second optical fibers further forming two interfering arms between the first coupling region and the second coupling region;

wherein a propagation constant in a portion of the first optical fiber in the first coupling region is different from a propagation constant in a portion of the second optical fiber in the first coupling region; and wherein the first and second optical fibers are coupled at a third coupling region.

18. The asymmetric optical fiber Mach-Zehnder interferometer of claim 1, wherein the two interfering arm are balanced.

19. The asymmetric optical fiber Mach-Zehnder interferometer of claim 1, wherein the two interfering arms are unbalanced.

20. A multiplexer/demultiplexer comprising the asymmetric optical fiber Mach-Zehnder interferometer of claim 1.

* * * * *

UNITED STATES PATENT AND TRADEMARK OFFICE
CERTIFICATE OF CORRECTION

PATENT NO.   : 6,226,091 B1
DATED        : May 1, 2001
INVENTOR(S)  : Colm V. Cryan It is certified that error appears in the above-identified patent and that said Letters Patent is hereby corrected as shown below:

Column 3,
Line 61, "between the signals." should read -- of the modes of the individual fibers. --;

Column 4,
Line 56, "I1:=10000" should read -- 11:=10000 --;
Line 58, "I2:=10000" should read -- 12:=10000 --;
Line 62, "Δ1:=I1-I2" should read -- Δ1:=11-12 --;

Column 5,
Line 6, "Ma" should be in the equation on the next line prior to "(λ) :=";
Line 12, "Mb" should be in the equation on the next line prior to "(λ) :=";
Line 37, "a" should read -- at --;
Line 39, "a" should read -- as --;
Line 51, "I1:=10000" should read -- 11:=10000 --;
Line 52, "I2:=10000.32265" should read -- 12:=10000.32265 --;
Line 57, "Δ1:=1-I2" should read -- Δ1:=11-12 --;
Line 66, "Ma" should be in the equation at the top of column 6, prior to "(λ) :=";

Column 6,
Line 7, "Mb" should be in the equation on the next line prior to "(λ) :=";
Line 31, "embodiment" should read -- embodiments --;

Column 7,
Line 18, "51" should read -- 50 --; and

UNITED STATES PATENT AND TRADEMARK OFFICE
CERTIFICATE OF CORRECTION

PATENT NO. : 6,226,091 B1
DATED : May 1, 2001
INVENTOR(S) : Colm V. Cryan

It is certified that error appears in the above-identified patent and that said Letters Patent is hereby corrected as shown below:

Column 8,
Line 45, "arm" should read -- arms --.

Signed and Sealed this

Eighth Day of October, 2002

Attest:

Attesting Officer

JAMES E. ROGAN
Director of the United States Patent and Trademark Office